United States Patent
Krohm et al.

(10) Patent No.: US 9,296,652 B2
(45) Date of Patent: Mar. 29, 2016

(54) CONSTRUCTION MATERIAL MIXTURE, A METHOD FOR PRODUCING SAME, AND USE THEREOF

(71) Applicants: Werner Krohm, Dortmund (DE); Jürgen Bender, Monheim (DE); Christian Scheidt, Dusseldorf (DE)

(72) Inventors: Werner Krohm, Dortmund (DE); Jürgen Bender, Monheim (DE); Christian Scheidt, Dusseldorf (DE)

(73) Assignees: Steag Power Minerals GmbH, Dinslaken (DE); Kronos International, Inc., Leverkusen (DE)

( * ) Notice: Subject to any disclaimer, the term of this patent is extended or adjusted under 35 U.S.C. 154(b) by 81 days.

(21) Appl. No.: 14/359,456

(22) PCT Filed: Nov. 15, 2012

(86) PCT No.: PCT/EP2012/072804
§ 371 (c)(1),
(2) Date: May 20, 2014

(87) PCT Pub. No.: WO2013/076014
PCT Pub. Date: May 30, 2013

(65) Prior Publication Data

US 2014/0329670 A1   Nov. 6, 2014

(30) Foreign Application Priority Data

Nov. 22, 2011   (EP) .................................... 11190174

(51) Int. Cl.
*C04B 18/08*   (2006.01)
*C04B 14/30*   (2006.01)
(Continued)

(52) U.S. Cl.
CPC .............. *C04B 14/305* (2013.01); *B01J 21/063* (2013.01); *C04B 14/14* (2013.01);
(Continued)

(58) Field of Classification Search
CPC .............................. C04B 18/08; C04B 14/30
See application file for complete search history.

(56) References Cited

U.S. PATENT DOCUMENTS

| 8,795,428 B1 * | 8/2014 | Hill et al. .................... 106/705 |
| 2010/0137130 A1 | 6/2010 | Böök et al. |
| 2013/0087076 A1 * | 4/2013 | Hill et al. .................... 106/695 |

FOREIGN PATENT DOCUMENTS

| CN | 102219458 A | 10/2011 |
| JP | 2000-203913 A | 7/2000 |

(Continued)

OTHER PUBLICATIONS

Yu, Yeon-Tae, "Preparation of Nanocrystalline Ti02-Coated Coal Fly Ash and Effect of Iron Oxides in Coal Fly Ash on Photocatalytic Activity", Powder Technology, vol. 146, No. 1-2, Aug. 30, 2004, pp. 154-159.

(Continued)

*Primary Examiner* — Paul Marcantoni
(74) *Attorney, Agent, or Firm* — Fay Sharpe LLP

(57) ABSTRACT

A construction material mixture used as a concrete additive contains a puzzolanic substrate and a photocatalyst. The puzzolanic substrate and the photocatalyst are available in the form of a dry mixture. The construction material mixture is a cement free dry mixture, wherein the photocatalyst has a primary particle size of between 2 nm and 100 nm. The puzzolanic substrate consists of at least 90 weight % of fly ash with a grain size of between 0.1 μm and 1 mm. The substrate and the photocatalyst are available completely mixed so that the photocatalyst is at least partially distributed on the surface of the substrate.

21 Claims, 2 Drawing Sheets

(51) Int. Cl.
 *C04B 28/04* (2006.01)
 *C04B 40/00* (2006.01)
 *C04B 20/10* (2006.01)
 *B01J 21/06* (2006.01)
 *C04B 14/14* (2006.01)
 *C04B 111/20* (2006.01)

(52) U.S. Cl.
 CPC ............ *C04B 20/1066* (2013.01); *C04B 28/04* (2013.01); *C04B 40/0042* (2013.01); *C04B 2111/2061* (2013.01); *Y02W 30/92* (2015.05)

(56) References Cited

FOREIGN PATENT DOCUMENTS

| WO | WO 98/05601 A1 | 2/1998 |
| WO | WO 2008/142205 A1 | 11/2008 |
| WO | WO 2009/080647 A1 | 7/2009 |
| WO | WO 2010/002934 A2 | 1/2010 |

OTHER PUBLICATIONS

Surolia, Praveen K. et al., "$TiO_2$-Coated Cenospheres as Catalysts for Photocatalytic Degradation of Methylene Blue, *p*-Nitroaniline, *n*-Decane, and *n*-Tridecane under Solar Irradiation", Industrial & Engineering Chemistry Research, vol. 49, No. 19, Oct. 6, 2010, pp. 8908-8919.
Bellardita, M. et al., "Photocatalytic Activity of $TiO_2$/$SiO_2$ Systems", Journal of Hazardous Materials, vol. 174, Feb. 1, 2010, pp. 707-713.
Holzapfel et al., "Flugasche-Aufbereitung: neue Rohstoffe and Recycling", TIZ-Fachberichte, vol. 111, No. 2, 1987, pp. 78-83 (English Abstract).
DIN EN-196-1, "Methods of Testing Cement", May 2005.
DIN EN 450-1, "Fly Ash for Concrete", Oct. 2012.
DIN 1045-2, "Plain, Reinforced and Prestressed Concrete Structures", Aug. 2008.
International Search Report of International Application No. PCT/EP2012/072804 dated Feb. 15, 2013, 6 pages.
International Preliminary Report on Patentability of International Application No. PCT/EP2012/072804 dated May 27, 2014, 11 pages.
Gumz et al., "Schlackenkunde", Springer-Verlag, Berlin 1958.

\* cited by examiner

CONSTRUCTION MATERIAL MIXTURE, A METHOD FOR PRODUCING SAME, AND USE THEREOF

The present invention relates to a dry construction material mixture. In particular, the present invention relates to a dry construction material mixture which can be used as a functional additive for mortar mixtures and concrete mixes.

In the field of technology various types of construction material are known. In the execution of building projects especially moldable construction materials, such as mortar and concrete, are utilized.

Concrete consists of binders, for example cement, water and granulations and, optionally further additives for influencing functional properties.

The requirements for building materials and the components of these building materials are manifold and differ, depending on the use. On the one hand, the production of concrete should result in a construction material of highest quality. On the other hand, it is anticipated to achieve additional requirements, for example aesthetic appearance or specific additional functional benefits. Correspondingly, there are concrete additives or concrete additions which improve the properties of wet concrete (for example processability and processing time) and/or also the hardened concrete (for example resistance). These additives and additions are to be used in a way that does not only improve the desired properties, but that also does not overly impair other relevant properties.

A well-known additive for concrete consists of photocatalytic materials, for example titanium dioxide ($TiO_2$).

The publication WO2010002934A2 describes a fire and temperature-resistant construction material consisting, among other things, of cement, titanium dioxide, pyrogenic silica and perlite.

In WO 2008/142205 A1 it is described to cover a substrate with photocatalytically active material. In particular, the substrate particles comprise metallurgical slag, for example slag sand.

Under the influence of electromagnetic radiation, especially UV radiation and visible light, such photocatalysts can have a favorable effect on the decomposition of organic compounds as soon as these compounds come in contact with the concrete. Moreover, they can contribute also to a reduction of inorganic atmospheric pollutants, such as nitrogen oxides and sulfoxides.

Exemplary in this context would be the photocatalysts marketed under the brand name "KRONOClean" by the company KRONOS.

For processing technological reasons, these photocatalysts are preferably used as an aqueous preparation and can be added when preparing the wet concrete.

From the application WO 98/05601 A1 it is known to mix hydraulic binders with photocatalytic particles and provide this as a construction material mixture. From WO 2009/080647 A1 it is known that the photocatalytic components can be applied to substrate particles, for example metakaolin substrates.

However, when improving the resulting properties of the finished concrete, it should be taken into account that the processability of the construction material is an extremely relevant issue. Regarding the processability, accepted and well-known criteria are the water requirement and compatibility of the construction material mixture, as well as the spreading dimensions of the prepared construction material.

It is the object of the invention to provide a construction material mixture which improves the processability of photocatalytically active construction material mixtures without negatively influencing the resulting properties regarding stability and photocatalytic activity.

In addition, it is intended to reduce as much as possibly the requirement for photocatalytic material when using the construction material mixture without significantly impairing the photocatalytic activity of the resulting material. It is intended to achieve high photocatalytic efficiency while at the same time reducing the photocatalytic material and improving the technical properties of the concrete.

Furthermore, it is the object of the invention to provide concrete products with photocatalytic properties in which the use of photocatalytically active substance is reduced.

This object is achieved with a construction material mixture having the properties of claim 1.

Furthermore, this object is achieved by the production method described in claim 6, as well as a construction material mixture produced according to the specifications of production claim 11.

According to the invention, the construction material mixture comprises a puzzolanic substrate consisting of fly ash with a rounded or spherical grain shape. Said substrate has been mixed with a fine-particle photocatalyst.

Fly ash is a fine-grained combustion residue of carbon dust and optionally used co-combustion materials accumulated in power plants. Its composition depends on the type and origin of the carbon, type and amount of the co-combustion materials and the combustion conditions. Fly ash is a well-known standardized additive for construction materials (DIN EN 450).

The average grain size of the substrate lies between 0.1 µm and 1 mm. The mixture of substrate and photocatalyst is available in such a way that a portion of the fine-grained photocatalytic material is applied on the substrate. The fine, smaller photocatalytic particles are at least partially available on the surface of the larger substrate particles. According to the invention, the puzzolanic substrate consists at least 90 weight % of fly ash.

Technical literature includes numerous references regarding the properties of fly ash. Thomas Holzapfel and Hans-Ulrich Bambauer provide a summary in TIZ-Fachberichte, vol. 111, no. 2, 1987. A comprehensive characterization, which is still valid for currently available fly ash grades, originates from the year 1958 (Gumz, W.; Kirsch, H. and Mackowsky, M.-Th.; Schlackenkunde. Springer-Verlag, Berlin 1958). Basically, fly ashes are dusty substances. The grain size spectrum comprises several orders of magnitude of approximately between 0.01 µm and 1 mm. Grain shapes are basically different, predominantly there are globated particles with smooth to micro-rough surfaces. It is a well-known fact that sometimes the fly ash particles appear as hollow grains. The composition of fly ash depends on the carbon and combustion processes used.

In this context, a rounded or spherical grain shape involves that more than 50% of the substrate particles have a rounded or spherical grain shape.

According to the invention, a substance accumulated during combustion processes, especially energy producing processes, is processed together with a scarce and expensive raw material (the photocatalyst) into an optimized construction material mixture which combines and improves the advantageous properties of both basic materials. As puzzolanic material with a spherical grain shape and grain distribution the fly ash is conducive to an improved construction material property with regard to stability and pore distribution. On the other hand, as substrate for the photocatalyst it contributes to improving the requirement of photocatalytic material while at the same time maintaining photocatalytic efficiency.

Puzzolanic materials, which also include fly ash, are generally known concrete additions. According to DIN EN 206-1/DIN 1045-2, fly ash may be counted to the water/cement ratio and the minimum cement content. Because of their chemical composition they act as a binder when combined with water and an alkaline binder and are used as additions for producing mortar and concrete.

Although the use of fly ash as concrete addition is generally known it came as a surprise that the production of a dry mixture of a puzzolanic substrate consisting of fly ash with a rounded or spherical grain shape and mixed with a photocatalytic material had an advantageous effect in the production of concrete when said dry mixture was added. It improves the processability and increases the photocatalytic effectiveness.

As a result, the invention-based construction material mixture has significant advantages when compared with the mixtures known from prior art. Especially with regard to the processability in concrete production, it exceeds the properties of the combinations of puzzolanic substances and photocatalysts proposed in prior art. Moreover, the invention-based construction material mixture is available in the form of a cement-free mixture. Correspondingly, the photocatalytically active substances are mixed with the fly ash. With this mixture a primary distribution of the photocatalytically active substances on the fly ash particles is achieved. During the subsequent process of mixing the concrete, this primary distribution provides an improved distribution of the photocatalyst compared with construction materials in which the dry substances, including cement, are mixed. The photocatalytic material has fine particles with primary particle sizes of between 2 nm and 100 nm and secondary particle sizes (agglomerate) of between several 100 nm and up to 1 µm.

Therefore, when first the puzzolanic rounded or spherical substrate is mixed with the photocatalytic material in such a way that the photocatalytic material is distributed at least partially on the surface of the substrate, the photocatalytic material has an improved effect when it is later added to a binder mixture. Compared with the currently known methods, less photocatalytic material is required to achieve an equal or greater effectiveness than that achieved with methods used according to prior art.

The production of such a dry mixture creates a hybrid photocatalyst which combines advantages of the photocatalyst activity and the effect of other construction material properties.

In particular, a respective compound or distribution of the rounded or spherical puzzolanic substrate and the photocatalytic material can be achieved with an intensive dry powder mixer (for example by Eirich, Loedige or Henschel). When mixing these two components the clearly smaller photocatalytic particles settle on the puzzolanic substrate material. As a durable dry mixture, the resulting material can be easily and effectively used in further processing.

When using the mixture, the puzzolanic substrate goes through a puzzolanic reaction with the binder used and produces an improved processability, thus increasing stability and resulting in improved concrete properties. On the other hand, the photocatalytic particles distributed on the substrate particles and mixed between the particles are better dispersed and more effective in a later binder mixture. However, these considerations alone cannot completely explain the surprising increase in effectiveness. It is possible that there is a further synergetic effect in which the substrate acts later as an adsorbent for toxic substances which react on the photocatalytic centers arranged on the substrate grains after the concrete has hardened.

It is also possible that because of the rounded or spherical grain shape the pore structure changes, especially at the photocatalytically reactive concrete surfaces, and said changed pore structure has a positive effect on the decomposition rates.

The invention-based construction material mixture is not only photocatalytically more effective, i.e., it achieves with less photocatalytic use at least the same decomposition rates than in prior art, but its construction material properties are equal or better than the respective cement mixtures known from prior art. Furthermore, the rounded grain shape of the puzzolanic substrate improves the processing of a concrete or cement mixture, potentially allowing for water savings and a lower pore volume, as well as higher stability.

While fine additions, such as the photocatalyst, increase the water requirement of concrete and can have a negative effect on processability, better pore-filling can improve the stability.

The invention-based combination of the rounded or spherical puzzolanic substrate on fly ash with photocatalytic materials partially distributed on it has the effect that both advantages can be utilized through a differentiated adjustment and optimization of the pore volume, pore size, processing behavior and stability of the resulting concrete.

Therefore, the invention allows for optimization and cost reduction with regard to photocatalytic effectiveness and the technical properties of construction material.

Essential for the invention is the fact that the photocatalytic material and the puzzolanic substrate are brought together from fly ash, and the distribution of the photocatalytic material on the puzzolanic substrate and the intensive mixing of photocatalyst and substrate takes place before any other additives are added. Only in this way the invention can develop its advantageous effect.

The invention-based particle size of the binder can basically extend over a large area. However, one to three orders of magnitude exist between the size of the primary particle of the photocatalyst and the fly ash.

In an advantageous embodiment the fine-particle photocatalyst contains titanium dioxide, preferably in anatase configuration. Titanium dioxide is a well-known photocatalyst, which is excellently suited for executing the invention. Based on titanium dioxide, different photocatalytic products which to some extent differ significantly regarding design and effectiveness are offered on today's market. For example, there are products with optimum effective surface which have agglomerates of titanium dioxide. In addition, there are modifications of titanium dioxide photocatalysts which efficiently contribute to a reduction of toxic substances not only when activated with UV radiation, but also with radiations in the range of visible light (example KRONOClean 7000).

The measurements of photocatalyst particle agglomerates are frequently in the range of between up to several 100 nm and above 1 µm, while the primary particle size lies in the range of between 2 nm and 100 nm.

It is advantageous to use the concrete photocatalyst titanium dioxide because the product has already been extensively tested and is well-known, and it is available in different forms of use.

The invention can be applied with all available fine-particle product designs of titanium dioxide, wherein in this context fine-particle involves a mixture with an average primary particle size of between 2 nm and 100 nm, optionally with larger agglomerates.

In a further development of the invention, besides the above-mentioned materials of fine-particle photocatalyst and fly ash, the construction material mixture has additional filling materials. In particular, these filling materials have a grain shape that differs from that of fly ash and they can have sharp-edged to round grain shapes. Such filling materials can especially be used as flow enhancers and are conducive to the material properties when the construction material mixture is added in the course of further processing. In principle, these filling materials can have further functional properties, for example they can have a puzzolanic effect.

Such filling materials involve any filling materials, for example trass powder, basalt meal, slag sand, aerosol, or even different substances. However, the mass portion of these filling materials with different grain shape is always smaller than the portion of the substrate with spherical or rounded grain shape.

In one embodiment of the invention the dry mixture consists exclusively of photocatalyst and the puzzolanic substrate (which, in turn, consists at least 90% of fly ash), i.e., it does not contain any filling materials. In this case, the photocatalytic portion comprises between 5% and 50%, preferably between 15% and 35%, wherein the matter involves mass portions.

Empiric tests have shown that the invention-based construction material mixture develops an especially advantageous effect when the above-mentioned weight proportions are used. According to this embodiment, the proportion of fly ash is as great as that of the photocatalyst, however preferably greater.

As a result, sufficient substrate surface is available for the distribution of the photocatalyst. On the other hand, it can be ensured that the photocatalyst is adequately separated by the fly ash.

In the context of the invention, an expert can vary the share ratio, depending on the primary objective he wants to achieve with the invention-based construction material mixture. For example, when the advantageous effect of the puzzolanic substrate as puzzolanic component is emphasized, a higher portion of puzzolanic substrate can be selected. Depending on the requirements, an optimization can be made by means of the well-known and routinely performed methods and experiments.

In the invention-based construction material mixture, preferably the average grain size of the substrate is smaller than 400 μm, especially preferred smaller than 200 μm and in particular smaller than 50 μm.

A reduction of the grain size of the puzzolanic substrate allows for an even better mixture of substrate and photocatalyst and distribution of the photocatalyst on the surface of the substrate substance.

Subsequently, the invention is explained in more detail by means of the enclosed figures.

Figure 1A:
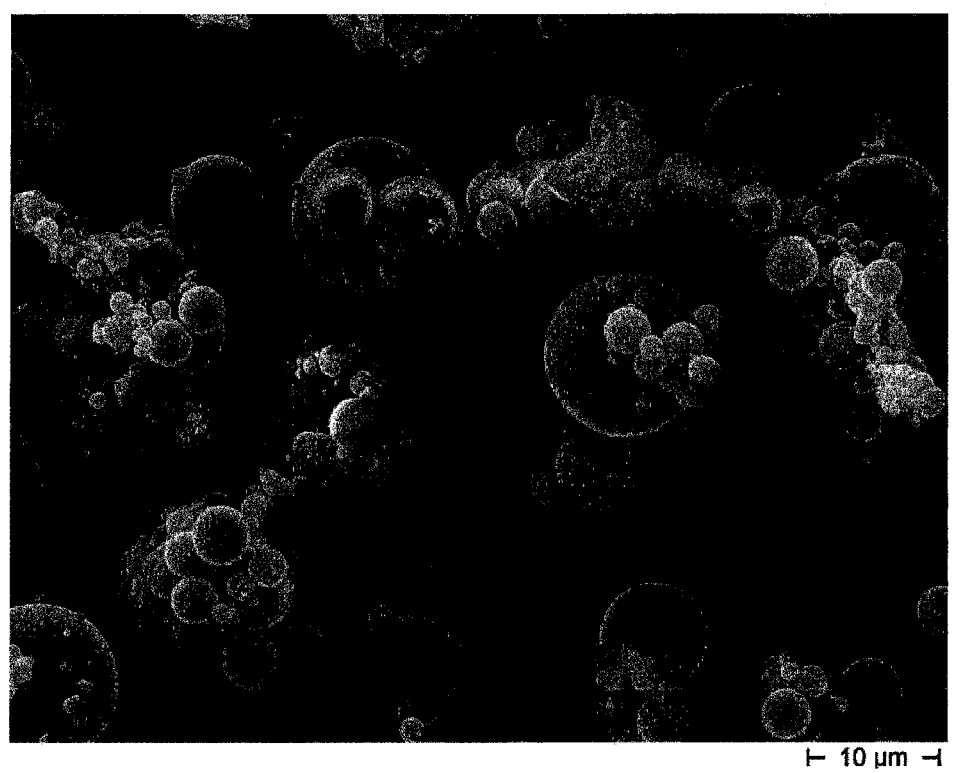
FIG. 1a shows a representation of fly ash grains taken with an electron microscope (steament H4). It clearly shows the spherical grain shape of the fly ash, as well as the distribution of grain sizes which extend approximately over 1 to 2 orders of magnitude.
Figure 1B:
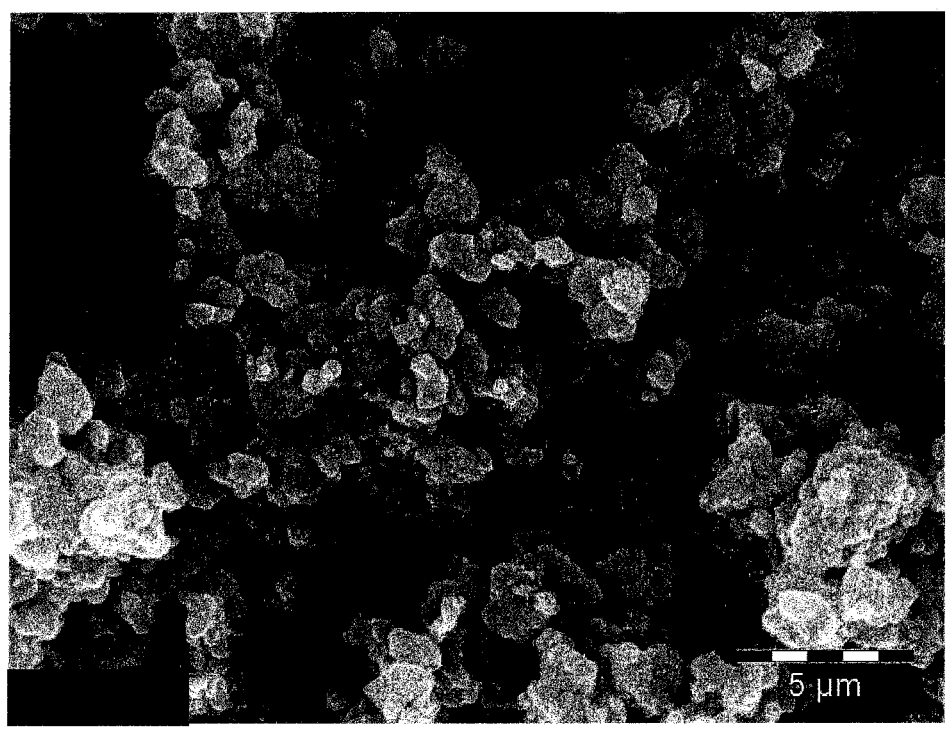
FIG. 1b shows an image of a fine-particle titanium dioxide photocatalyst (KRONOClean 7000), wherein attention should be paid to the scale for estimating the grain sizes. In particular, the photocatalyst is available in the form of agglomerates.
Figure 1C:
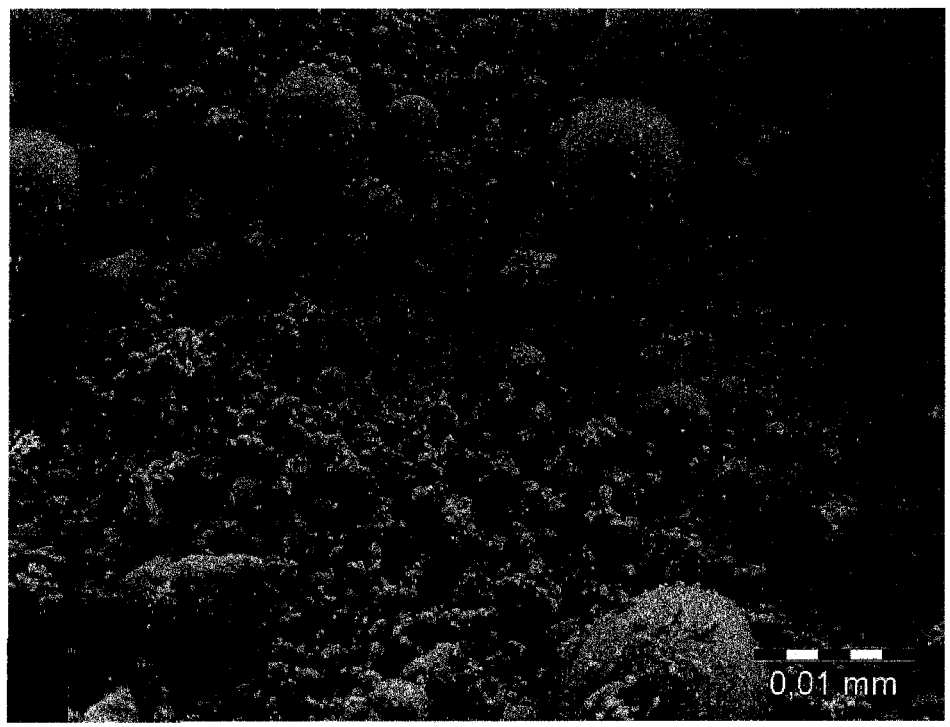

FIG. 1c shows the mixture consisting of titanium dioxide photocatalyst (KRONOClean 7000, 1 mass portion) and fly ash (steament H4, 3 mass portions), wherein it is obvious that fly ash and photocatalyst are available in thoroughly-mixed manner. On the one hand, a comparison with the representation clearly shows that in the mixture according to this embodiment of the invention the mixing process of the components resulted in a better dispersion of the photocatalytic components. On the other hand, it is shown that these smaller particles are distributed on the surfaces of the greater fly ash particles. On the surface of puzzolanic substrate material grains photocatalyst granulations are accumulated, wherein especially the small-size components of the photocatalytic mixture have settled on the surface of the substrate. Some of the greater agglomerates are still separate from the substrate. The mixture shown has been made with a dry mixing operation in an intensive dry powder mixer of the company Henschel.

These images are not able to explain the reason for the increase in efficiency of the photocatalytic activity when reducing the photocatalytic material, which has been substantiated in the tests. However, it appears that it is possible that a type of photocatalytically active grain is formed from the substrate when smaller components of the photocatalytic mixture are accumulating on the spherical substrate grains. On the other hand, the grains of the substrate with their spherical or round shape ensure a thorough mixture and an excellent distribution among the substrates, which takes effect during later application.

According to this embodiment, the dry mixture of fly ash and photocatalyst shown, here titanium dioxide, is made in an intensive dry powder mixer, wherein the mixture shown is mixed intensively for about 5 minutes. The ratio of fly ash and photocatalyst is determined based on the individual case at hand. In particular, a useful mixture ratio is based on the determined value of pore content according to the method based on points and the determined spreading dimensions in the mortar test (DIN EN 196).

The method based on points for determining the tightest packing is known among experts and is described, for example, in the DAfStB guidelines regarding self-compacting concrete. This method is based on the fact that fine-grained material to be screened can be reproducibly packed with light impacts to a substance-specific packing density when the water content suffices for saturating the dense grain structure. By gradually increasing the water content, the transition point from "not yet compaction-capable" to "just compaction-capable" is determined. Subsequently, by means of re-weighing the water content of the sample is determined, and pore content and water requirement are calculated.

A mass ratio determined in this way is subjected to a mortar test, wherein for a quantity of the mixture of 25% cement used a consistent spreading dimension compared to the use of 100% cement should be shown. If this is not the case, the ratio between fly ash and photocatalyst can be changed further.

The following table shows as a characteristic dimension for the processability of a construction material preparation the spreading dimension (mortar test according to DIN EN 196) for different compositions:

TABLE 1

| Mortar test according to DIN EN 196 | |
| --- | --- |
| Composition | Spreading dimension |
| 1) contains proportion of cement (CEM I 42.5 R), which is defined to be 100 weight % | 164 mm |
| 2) relating to 1) contains 75 weight % cement and 25 weight % fly ash (steament H4) | 173 mm |

TABLE 1-continued

Mortar test according to DIN EN 196

| Composition | Spreading dimension |
|---|---|
| 3) relating to 1) contains 75 weight % cement and further 18.8 weight % cement mixed with 6.2 weight % photocatalyst (KRONOClean 7000) | 135 mm |
| 4) with invention-based construction material mixture, relating to 1) contains 75 weight % cement and 18.8 weight % fly ash (steament H4) mixed with 6.2 weight % photocatalyst (KRONOClean 7000) | 165 mm |
| 5) relating to 1) contains 75 weight % cement and 18.8 weight % slag meal mixed with 6.2 weight % photocatalyst (KRONOClean 7000) at a mass ratio of 3:1 | 121 mm |
| 6) relating to 1) contains 75 weight % cement and 18.8 weight % copper slag sand mixed with 6.2 weight % w photocatalyst (KRONOClean 7000) at a mass ratio of 3:1 | 124 mm |

In example 1) of table 1 only cement was used as a binder. For the remaining examples, the cement proportion of this mixture is defined 100 weight %. The spreading dimension indicates how flowable and processible such mixture is. The value determined here can be used as reference value for the remaining examples.

In example 2) of table 1 fly ash and cement are mixed at a mass ratio of 25:75. The fly ash increases the spreading dimension, resulting in the fact that the mortar mixture can be easier pumped and processed.

In example 3) of table 1 a pre-mixture consisting of 3 mass portions cement and 1 mass portion titanium dioxide photocatalyst was produced, and this mixture, including the cement, was mixed at a mass ratio of 25:75. The spreading dimension is significantly reduced compared with example 1) of table 1, which can be attributed to the fine-particle photocatalytic effect. In order for the cement to achieve a photocatalytic effect, it is necessary in this case to accept a significant deterioration of the spreading dimensions.

In the invention-based example 4), 1 mass portion photocatalyst was mixed for 5 minutes with fly ash at a mass ratio of 1:3 in an intensive dry powder mixer of the company Eirich. Subsequently, this invention-based construction material mixture was mixed with cement at a mass ratio of 25:75. Despite the provision of photocatalytic properties, which even exceed those of example 3), the spreading dimension can be processed just as well as the mixture according to example 1). According to the invention, with consistent or even improved processability, a construction material with an effective additional benefit of toxic substance reduction is produced.

The additives slag sand and copper slag sand do not have such a positive effect on processability. The spreading dimension is significantly lower than with the invention-based mixture.

Consequently, although slag sand and copper slag sand by themselves as concrete additions have a positive effect on the spreading dimension, and thus the processability, similar to the effect of fly ash, in connection with the photocatalyst the positive effects of these two additions almost completely disappear. Only the invention-based mixture of fly ash and photocatalyst keeps the spreading dimension on a high level and at the same time allows for the positive photocatalytic effects.

For the quality or resulting components, in particular for the surface quality, it is also significant which packing density can be achieved with the respective construction materials.

For the basic materials a determination of the tightest packing can be made:

Determination of the tightest packing based on points (indication of pore proportion in volume percent)

TABLE 2

| Composition | Pore proportion (volume percent) |
|---|---|
| 1) cement (CEM I 42.5 R) | 49.8 |
| 2) cement (CEM I 42.5 R) with photocatalyst (KRONOClean 7000) at a mass ration of 3:1 | 55.2 |
| 3) fly ash (steament H4) | 35.5 |
| 4) invention-based construction material mixture, containing fly ash (steament H4) and photocatalyst (KRONOClean 7000) at a mass ratio of 3:1 | 40.0 |
| 5) pulverized limestone | 39.5 |
| 6) pulverized limestone and photocatalyst (KRONOClean 7000) at a mass ration of 3:1 | 55.8 |
| 7) basalt meal | 42.3 |
| 8) basalt meal and photocatalyst (KRONOClean 7000) at a mass ration of 3:1 | 63.8 |
| 9) slag meal | 46.0 |
| 10) slag meal and photocatalyst (KRONOClean 7000) at a mass ration of 3:1 | 56.0 |
| 11) copper slag sand | 39.2 |
| 12) copper slag sand and photocatalyst (KRONOClean 7000) at a mass ration of 3:1 | 51.6 |

As shown in table 2, the invention-based mixture consisting of fly ash and photocatalyst according to example 4) of table 2 has to be packed extremely dense. The pore proportion lies at the value that is usually evident in rock flours.

These examples show that a mixture, for example according to 6) or 8) of table 2 is considerably more difficult to pack. This is due to the fact that the rock flours with the edgy grain shape do not allow for packing that is comparable to spherical or rounded fly ash.

Accordingly, compared with mixtures consisting of aggregates (for example even metakaolin) and photocatalysts, the invention-based mixture improves the resulting construction material properties even in this respect when compared with well-known photocatalytic construction materials. Denser surfaces represent less opportunities for damaging substances to attack the concrete.

In compliance with the ISO 22197-1, the photocatalytic effectiveness regarding the NO decomposition was tested on the hardened specimen. According to DIN EN 196, the test specimens were produced with an additive/binder ratio of 3:1. The mass portions fly ash and/or photocatalyst were also counted in among the mass portion "binder portion". The following table shows the results of the measurement of the NO decomposition:

NO decomposition

TABLE 3

| Composition | NO decomposition in percent |
|---|---|
| 1) contains proportion of cement (CEM I 42.5 R), which is defined to be 100 weight % cement | 0.9 |
| 2) relating to 1) contains 75 weight % cement and 25 weight % fly ash (steament H4) | 1.3 |
| 3) relating to 1) contains 75 weight % cement and further 18.8 weight % cement mixed with 6.2 weight % photocatalyst (KRONOClean 7000) | 10.0 |

TABLE 3-continued

| Composition | NO decomposition in percent |
|---|---|
| 4) with invention-based construction material mixture, relating to 1) contains 75 weight % cement and 18.8 weight % fly ash (steament H4) and 6.2 weight % photocatalyst (KRONOClean 7000) | 11.6 |

When using the invention-based construction material mixture, example 4) of table 3, it appears that an increased photocatalytic effect takes place when compared with the mixture which contains the same volume photocatalyst but is exclusively dispersed in cement, see example 3) of table 3. At the same time, according to the representation shown above, wet concrete produced with the invention-based construction material mixture comprises the same good or improved technical properties of concrete when compared with concrete produced with pure cement and photocatalyst or with cement and fly ash (see table 1).

The invention-based construction material mixture offers a further advantage when using colored inhomogeneous substrate materials. For example, it is generally known that the use of fly ash in concrete results in colored inhomogeneous surfaces, making such compositions unsuitable for producing exposed concrete surfaces. An addition of titanium dioxide photocatalyst results in leveling inconsistencies in color. As a result, the invention-based construction material mixtures with fly ash are especially suitable for the production of exposed concrete surfaces, concrete components, paving stones, etc., as well as interior and exterior plaster.

In particular, the invention-based construction material mixture can be used for producing concrete products, for example concrete paving blocks. Currently, for the production of concrete paving blocks two layer systems are used, wherein a core concrete is covered with a decorative concrete which comes in contact with the surrounding area. In this case, the photocatalytic concrete additive in the invention-based construction material mixture is used only in the decorative concrete because only this portion comes in contact with the surrounding area. However, in addition the invention can be used in numerous other construction materials, for example interior and exterior plaster, concrete components or other concrete surfaces.

The invention claimed is:

1. A construction material mixture used as concrete additive, wherein the construction material mixture contains a pozzolanic substrate and a photocatalyst, wherein the pozzolanic substrate and the photocatalyst are a dry mixture, characterized in that the construction material mixture is a cement-free dry mixture, wherein the photocatalyst has a primary particle size of between 2 nm and 100 nm and a secondary particle size of between 100 nm and 1 μm, wherein the pozzolanic substrate consists at least 90 weight % of fly ash with a grain size of between 0.1 μm and 1 mm, wherein the pozzolanic substrate and the photocatalyst are uniformly mixed so that the photocatalyst is at least partially coated on the surface of the pozzolanic substrate.

2. The construction material mixture according to claim 1, wherein the photocatalyst contains titanium dioxide.

3. The construction material mixture according to claim 2, wherein the titanium dioxide is anatase.

4. The construction material mixture according to claim 1, wherein the dry mixture also contains a filling material with a different grain shape.

5. The construction material mixture according to claim 4, wherein the filling material includes sharp-edged to round grain shapes.

6. The construction material mixture according to claim 1, wherein the dry mixture consists of the photocatalyst and the pozzolanic substrate, wherein the photocatalytic portion is between 5 weight % and 50 weight %.

7. The construction material mixture according to claim 1, wherein the average grain size of the pozzolanic substrate is less than 400 μm.

8. A method for producing a photocatalytic construction material mixture as a concrete additive, comprising:
preparing a dry mixture consisting of a fine-particle photocatalyst with a primary particle size of between 2 nm and 100 nm, a secondary particle size of between 100 nm and 1 μm and a pozzolanic substrate, wherein the pozzolanic substrate consists of at least 90 weight % of fly ash with a grain size of between 0.1 μm and 1 mm, wherein the photocatalyst and the pozzolanic substrate are mixed in an intensive dry powder mixer.

9. The method according to claim 8, wherein titanium dioxide is used as the photocatalyst.

10. The method according to claim 9, wherein the titanium dioxide is anatase.

11. The method according to claim 8, wherein a filling material with a different grain shape is added to the dry mixture.

12. The method of claim 11, wherein the filling material includes sharp-edged to round grain shapes.

13. The method according to claim 8, wherein the dry mixture consists of the photocatalyst and the pozzolanic substrate, wherein the photocatalyst proportion is between 5 weight % and 50 weight %.

14. The method according to claim 11, wherein the photocatalyst proportion is between 15 weight % and 35 weight %.

15. The method according to claim 8, wherein pozzolanic substrate has an average grain size of less than 400 μm.

16. The method according to claim 15, wherein the average grain size of the pozzolanic substrate is less than 200 μm.

17. The method according to claim 16, wherein the average grain size of the pozzolanic substrate is less than 50 μm.

18. A photocatalytic construction material mixture for mortar or concrete, comprising:
preparing a cement-free dry mixture from a photocatalyst with a primary particle size of between 2 nm and 100 nm, a secondary particle size of between 100 nm and 1 μm and a pozzolanic substrate, wherein the pozzolanic substrate consists at least 90 weight % of fly ash with a grain size of between 0.1 μm and 1 mm, wherein the photocatalyst and the pozzolanic substrate are mixed in an intensive dry powder mixer.

19. The photocatalytic construction material mixture according to claim 18, wherein titanium dioxide is the photocatalyst and wherein fly ash is the pozzolanic substrate.

20. The photocatalytic construction material mixture of claim 19, wherein the titanium dioxide is anatase.

21. The photocatalytic construction material mixture according to claim 20, further including a filling material which includes sharp-edged to round grain shapes.

* * * * *